United States Patent Office 3,061,611
Patented Oct. 30, 1962

3,061,611
1-ACETYL-3-INDOLEACETALDEHYDE SEMICARBAZONE
James N. Coker and Melvin Fields, Wilmington, Del., and Arthur O. Rogers, Lewiston, N.Y., assignors to E. I. du Pont de Nemours and Company, Wilmington, Del., a corporation of Delaware
No Drawing. Filed July 31, 1959, Ser. No. 830,738
1 Claim. (Cl. 260—319)

This invention relates to the preparation of 1-acetyl-3-indoleacetaldehyde semicarbazone, a new compound. This application is a continuation-in-part of our copending application, Serial No. 684,416, filed September 17, 1957, now U.S. Patent No. 2,937,184.

The above copending application relates to a process for producing a variety of hydantoins from aldehyde and ketone semicarbazones or other hydrazones. The hydantoins are readily hydrolyzed to valuable amino acids. Example II discloses a particularly useful process for preparing tryptophan, an amino acid essential in human nutrition. Freshly prepared 3-indoleacetaldehyde semicarbazone was reacted at 100° C. with ammonium ions, carbonate ions and cyanide ions in aqueous solution to produce 5-(3-indolylmethyl)-hydantoin in 65% yield. Hydrolysis of this hydantoin in dilute aqueous alkali solution at 150° C. followed by neutralization with acid gave DL-tryptophan in good yield. Semicarbazide, used in preparing the 3-indoleacetaldehyde semicarbazone, was regenerated by the above reaction and a 63.4% recovery of the amount used in the starting material was obtained after separation of the hydantoin. The recovered semicarbazide was suitable for preparing more semicarbazone starting material.

The 3-indoleacetaldehyde semicarbazone used as the starting material in the above process has been prepared as described in Example 3 of Plieninger German application Serial No. K24529, printed August 2, 1956 (Klasse 1207.03), 2 pages of specification. Plieninger discloses that 3-indoleacetaldehyde semicarbazone was obtained in 60% yield by hydrogenating a reaction mixture containing 10 grams 3-indoleacetonitrile, 16.8 grams semicarbazide hydrochloride and 12 grams Raney-nickel catalyst in 100 cc. of 50% alcohol. This is an undesirably low yield from the 3-indoleacetonitrile, and it is difficult to prepare this valuable nitrile in the necessary purity. 3-indoleacetonitrile is a low melting solid (M.P. 34–36° C.) which is quite difficult to purify by crystallization. It is purified most efficiently by high vacuum distillation (B.P. 160° C. at 0.02 mm. mercury pressure), an operation which does not appear to be economically feasible on a commercial scale. The 3-indoleacetaldehyde semicarbazone is relatively unstable, e.g., when it was recrystallized extensively or allowed to stand for several days before conversion to hydantoin by the process of the preceding paragraph, the yields dropped off to 38% or lower.

It is an object of this invention to provide a stable new indole derivative which is suitable for use in synthesizing tryptophan and is relatively easy to prepare in satisfactory purity. Another object is to provide an efficient process for preparing this new compound in high yield. Other objects will become apparent from the specification and claims.

In accordance with this invention a new and useful compound, 1-acetyl-3-indoleacetaldehyde semicarbazone, is readily prepared in high yield by liquid phase hydrogenation of 1-acetyl-3-indoleacetonitrile and semicarbazide hydrochloride in the presence of a nickel hydrogenation catalyst. Mild hydrogenation conditions are satisfactory, i.e., the reaction can be conducted at room temperature and only slightly above atmospheric pressure, but these conditions can be varied in the usual manner for low pressure hydrogenations in general. Any of the known inert solvents for 1-acetyl-3-indoleacetonitrile and semicarbazide hydrochloride can be used in the liquid phase. Alcohol or alcohol-water mixtures are suitable when used with sodium acetate or other solubilizer salt, and have the advantage of low cost. The proportions of the 1-acetyl-3-indoleacetonitrile and semicarbazide are not critical, although it is more economical to use substantially equivalent proportions.

The use of 1-acetyl-3-indoleacetonitrile as a starting material in the process of this invention makes possible yields of over 80%. This is a surprising improvement over the teaching of the prior art. There are other important advantages. 1-acetyl-3-indoleacetonitrile is a stable compound melting at 112°–114° C. which is easily purified by recrystallization. The 1-acetyl-3-indoleacetaldehyde semicarbazone product is more stable and less soluble in alcohol or alcohol-water than 3-indoleacetaldehyde semicarbazone. It precipitates more cleanly from the reaction mixture and is more easily recovered in relatively pure form.

The new compound, 1-acetyl-3-indoleacetaldehyde semicarbazone is obtained as a white precipitate which is readily recrystallized from alcohol to a pure product melting at 201°–202° C. It is stable and can be stored under normal conditions without decomposition. It can be used to prepare 5-(3-indolylmethyl)-hydantoin directly, under the same conditions as 3-indoleacetaldehyde semicarbazone, since the 1-acetyl group is removed by hydrolysis during the course of the reaction. The yield is the same as when using freshly prepared 3-indoleacetaldehyde semicarbazone, but an important advantage is that the new starting material can be stored before use without affecting the yield.

The 1-acetyl-3-indoleacetonitrile starting material for the process of this invention is readily prepared in substantially quantitative yield from impure 3-indoleacetonitrile by a simple procedure, and is then readily recovered in pure form. For example, 30 parts of 3-indoleacetonitrile and 15 parts of freshly fused sodium acetate in 225 parts acetic anhydride are heated at gentle reflux for 3 hours, the acetic anhydride and acetic acid formed are removed by heating under vacuum to leave a brown residue, and the 1-acetyl-3-indoleacetonitrile produced is extracted with ethyl acetate. This product crystallizes from the ethyl acetate as light yellow needles in a yield of 97%. A single recrystallization from ethyl acetate gave a substantially pure product melting at 112–113° C.

An embodiment of the invention is illustrated by the following example, in which parts are by weight:

Example 1-acetyl-3-indoleacetonitrile (5 parts), semicarbazide hydrochloride (2.8 parts), and sodium acetate trihydrate (2.8 parts) were warmed in methanol (100 parts) until a solution was obtained. After cooling to room temperature, 5 parts of a 50% methanol slurry of Raney nickel catalyst (digested for 10 minutes in boiling methanol just prior to use) was added and a hydrogenation was carried out in a Burgess-Parr shaker assembly at room temperature and near-atmospheric pressure. After slightly more than one equivalent of hydrogen had been absorbed, the hydrogenation was stopped and the reaction mixture cooled to 0–5° C. Filtration removed the catalyst and the hydrogenation product was extracted into hot dimethylsulfoxide (three 50-part portions). After the hot extracts had been combined and filtered by suction through "Celite" filter aid, the filtrate was cooled to below 30° C. and water (300 parts) added. The flocculant white 1-acetyl-3-indole acetaldehyde semicarbazone product which precipitated was collected readily by suction filtration and air-dried. The yield amounted to 81.5%. After two recrystallizations from methanol, its melting point was raised from 186–187° C. to a constant value of 201°–202° C.

*Analysis.*—Calc'd. for $C_{13}H_{19}O_2N_4$: C, 60.47; H, 5.43; N, 21.71. Found: C, 60.22; H, 5.43; N, 21.77.

The following procedure may be used to convert the above product to 5-(3-indolylmethyl)-hydantoin, which yeilds tryptophan upon hydrolysis:

A pressure reactor was charged with 2.4 parts 1-acetyl-3-indoleacetaldehyde semicarbazone, 6.0 parts ammonium carbonate and 1.5 parts hydrogen cyanide in 60 parts water and heated at 100° C. for 4 hours with shaking. The reaction mixture was cooled to 0–5° C. and discharged. The 5-(3-indolylmethyl)-hydantoin which separated out was collected by suction filtration, washed with cold water and air-dried. A 64% yield of product was obtained which melted at 213°–215° C. After a single recrystallization from methanol, the material melted at 220°–221° C. and did not depress the melting point of an authentic sample of 5-(3-indolylmethyl)-hydantoin.

The 1-acetyl-3-indoleacetaldehyde semicarbazone can also be converted to tryptamine, a compound of known pharmaceutical importance. The semicarbazone, in solution in absolute alcohol saturated with ammonia, is hydrogenated in the presence of Raney nickel catalyst under conditions previously used for reducing nitriles to amines. This gives tryptamine directly by the following reaction:

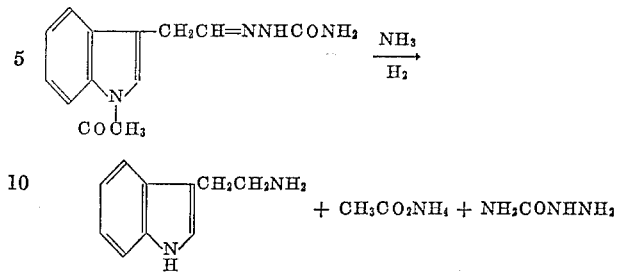

The new compound of this invention is also useful as a plant growth stimulant in the same manner as other indoles substituted in the 3-position, such as 3-indoleacetic acid.

Since many different embodiments of the invention may be made without departing from the spirit and scope thereof, it is to be understood that the invention is not limited by the specific illustrations except to the extent defined in the following claim.

We claim:

1-acetyl-3-indoleacetaldehyde semicarbazone.

References Cited in the file of this patent

Plieninger et al.: Chemische Berichte, vol. 88, pp. 1957–1961 (1955).

Plieninger et al.: Chemische Berichte, vol. 89, p. 274 (1956).

Fieser and Fieser: Organic Chemistry, pp. 235–236, third edition (1958).